(12) United States Patent
Kathan et al.

(10) Patent No.: US 9,744,484 B2
(45) Date of Patent: Aug. 29, 2017

(54) HELICALLY WRAPPED FILTER

(71) Applicant: PALL CORPORATION, Port Washington, NY (US)

(72) Inventors: Kyle Kathan, Land O' Lakes, FL (US); Jessica Bennett, Holiday, FL (US); Jose Camero, Schertz, TX (US)

(73) Assignee: Pall Corporation, Port Washington, NY (US)

( * ) Notice: Subject to any disclaimer, the term of this patent is extended or adjusted under 35 U.S.C. 154(b) by 176 days.

(21) Appl. No.: 14/315,490

(22) Filed: Jun. 26, 2014

(65) Prior Publication Data

US 2015/0375143 A1    Dec. 31, 2015

(51) Int. Cl.
| | |
|---|---|
| B01D 29/03 | (2006.01) |
| B01D 46/00 | (2006.01) |
| B01D 46/24 | (2006.01) |
| B01D 46/52 | (2006.01) |
| B01D 29/01 | (2006.01) |

(52) U.S. Cl.
CPC ......... B01D 29/035 (2013.01); B01D 29/012 (2013.01); B01D 46/0031 (2013.01); B01D 46/2411 (2013.01); B01D 46/523 (2013.01); B01D 2239/0654 (2013.01); B01D 2239/0695 (2013.01); B01D 2275/105 (2013.01)

(58) Field of Classification Search
CPC .............. B01D 29/035; B01D 46/0031; B01D 46/2411; B01D 29/012; B01D 46/523; B01D 2275/105; B01D 2239/0695; B01D 2239/0654
USPC ........... 210/497.1, 493.4, 493.1, 497.01, 490
See application file for complete search history.

(56) References Cited

U.S. PATENT DOCUMENTS

| | | | |
|---|---|---|---|
| 4,156,601 A | 5/1979 | Pieciak | |
| 4,402,830 A | 9/1983 | Pall | |
| 4,882,056 A | 11/1989 | Degen et al. | |
| 5,039,413 A | 8/1991 | Harwood et al. | |
| 5,252,207 A | 10/1993 | Miller et al. | |
| 5,290,446 A | 3/1994 | Degen et al. | |
| D349,567 S | 8/1994 | Miller et al. | |
| 5,543,047 A * | 8/1996 | Stoyell .................. | B01D 29/111 210/493.2 |
| D404,796 S | 1/1999 | Miller et al. | |

(Continued)

FOREIGN PATENT DOCUMENTS

| | | |
|---|---|---|
| EP | 0 335 571 A2 | 10/1989 |
| EP | 0 470 485 A2 | 2/1992 |

(Continued)

OTHER PUBLICATIONS

European Patent Office, Extended European Search Report in European Patent Application No. 15 173 390.4 (Nov. 9, 2015).

(Continued)

*Primary Examiner* — Madeline Gonzalez
(74) *Attorney, Agent, or Firm* — Leydig, Voit & Mayer, Ltd.

(57) ABSTRACT

A filter cartridge is provided for filtering particulates in fluid and gas streams. The filter cartridge has a filter element for filtering the streams and a helical wrap to give stability to the pleats in response to radially outward flow. The wrap has an outer layer for attaching to the filter element and an inner layer for strength and resisting pressure drops across the filter element.

27 Claims, 3 Drawing Sheets

(56) References Cited

U.S. PATENT DOCUMENTS

| | | | |
|---|---|---|---|
| 5,876,601 | A | 3/1999 | Geibel et al. |
| 5,902,482 | A | 5/1999 | Seeley et al. |
| 6,508,934 | B2 | 1/2003 | Van Pelt et al. |
| D476,058 | S | 6/2003 | Norton |
| 2009/0014378 | A1 | 1/2009 | Hundley et al. |
| 2011/0252757 | A1 | 10/2011 | Olson et al. |

FOREIGN PATENT DOCUMENTS

| | | |
|---|---|---|
| JP | 58-122013 A | 7/1983 |
| JP | 01-299615 A | 12/1989 |
| JP | 03-081344 U | 8/1991 |
| JP | 04-250804 A | 9/1992 |
| JP | 2001-031921 A2 | 2/2001 |

OTHER PUBLICATIONS

Intellectual Property Office of Singapore Search Report in Singapore Patent Application No. 10201504950Y (Dec. 13, 2016).
Japanese Patent Office, Notice of Reasons for Rejection in Japanese Patent Application No. 2015-121834 (dated Apr. 21, 2016).

\* cited by examiner

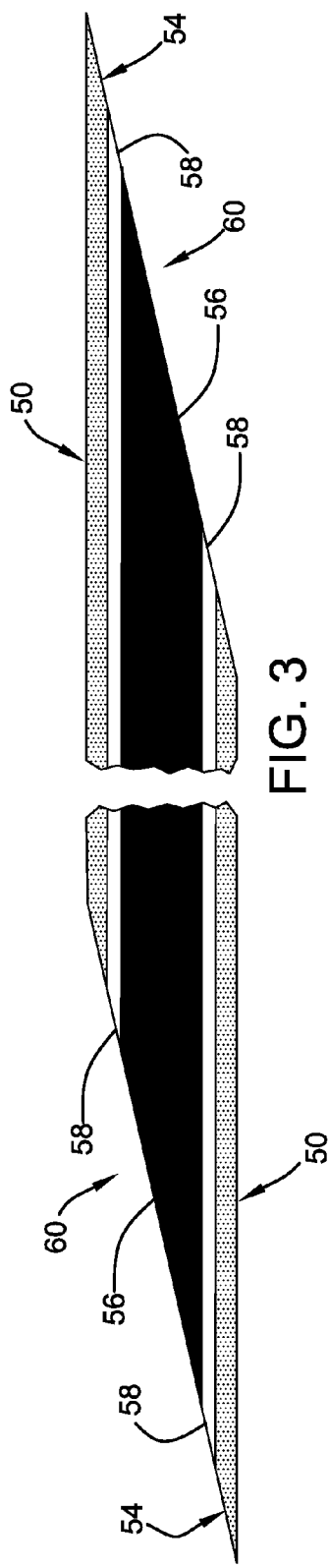
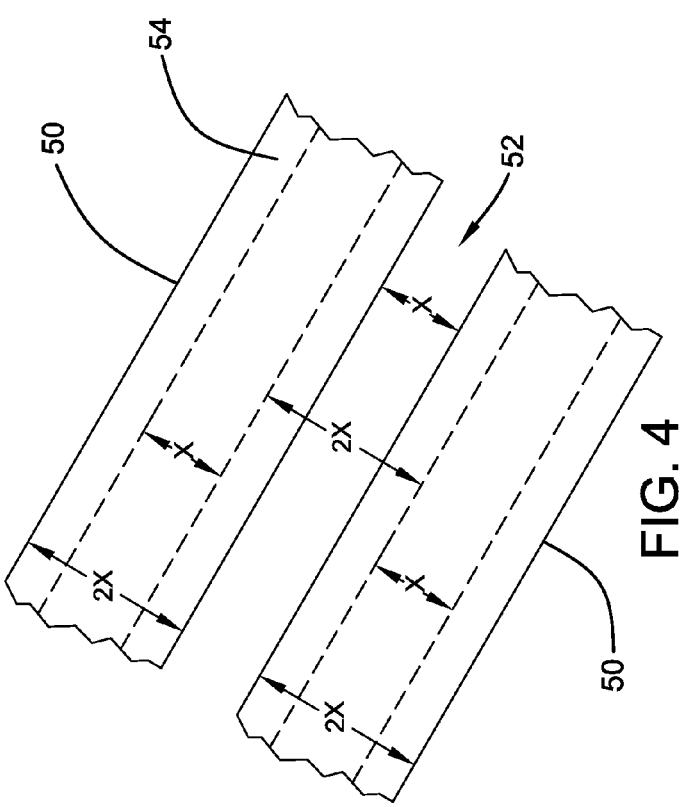

HELICALLY WRAPPED FILTER

TECHNICAL FIELD

This invention relates to pleated filter elements and, more particularly, to pleated filter elements having helical wraps.

BACKGROUND

Filter cartridges have a cylindrical filter element for filtering particulates from fluid and gas streams. Filters subject to radially inward (outside-to-inside) fluid flow typically have an interior core and an exterior cage. Filters subject to radially outward (inside-to-outside) fluid flow may not require an interior core. Some filters use a helical wrap rather than a cage to secure the filter element in the filter and reduce weight and cost.

Cageless, coreless filters subject to radially outward flow use single layer helical wraps that are very high in strength and modulus to resist differential pressures across the filter. The reinforced materials used in wraps are typically uniaxial; that is, they have high strength in the axial direction but little to zero strength in the cross-width direction. Use of high modulus fibers in wraps requires the use of materials with high fiber content by volume to be effective. As a result, wraps are difficult to work with due to fiber migration and handling. In addition, thermoplastic materials with high fiber content and high chemical compatibility do not bond well to hot adhesives commonly used in manufacturing filter elements.

Further, highly reinforced wraps used in many applications are very stiff and may lead to numerous undesirable manufacturing issues, including poor handling and performance, and low manufacturing yield. The stiff materials are difficult to manipulate while forming the filter element. The stiff material also has a tendency to separate from the ends of the filter element when cutting the filter element, which is undesirable during the end capping process. To end cap properly, the tails of the wrap may be trimmed. However, trimming the ends reduces the effective strength of the wrap and may lead to failures at pressures lower than designed. Because the highly reinforced wraps have little to zero strength in the cross direction, trimming the wrap prevents that load from being distributed along the entire width of the material. Only the width of the wrap bound in the end caps carries the load.

SUMMARY OF THE INVENTION

In one embodiment of the invention, a filter is provided for filtering particulates from fluid and gas streams. The filter has a cylindrical filter element for filtering material in response to fluid flow through the filter element. The filter element preferably comprises at least one filter medium having first and second sides, and a first drainage layer disposed on the first side of the filter medium and a second drainage layer disposed on the second side of the filter medium. At least one of the upstream drainage layer and downstream drainage layer may comprise a polymeric mesh or an extruded or woven polymeric mesh.

A porous wrap is helically wrapped around the filter element to form a plurality of adjacent turns under tension to hold the filter element in a cylindrical configuration. The wrap comprises an outer layer for attaching to the end cap and an inner layer for resisting radially outward forces generated by a pressure drop across the filter element. The inner layer has parallel edges which are narrower than the outer layer and are attached to outer layer. The inner layer may be attached to the outer layer by a double-sided adhesive tape applied between the inner and outer layers, a hot melt adhesive applied between the inner and outer layers, or by ultrasonically spot welding the inner and outer layers.

An end cap forming a fluid tight seal is secured to an end of the filter element. In a preferred embodiment, when the wrap is attached to the end cap, the outer layer is inserted at least 50 thousandths of an inch into the end cap, and more preferably at least 100 thousandths of an inch into the end cap.

To withstand the pressure drop caused by inside out flow across the filter element, the inner layer has a modulus of elasticity of at least about 3 million psi, and more preferably at least about 12 million psi. The inner layer preferably comprises a polyphenylene strip which is reinforced with up to about 60% by weight of carbon fiber content, or up to about 70% by weight of glass fibers. Other materials for the inner layer may include a polybutylene terephthalate strip reinforced with carbon fibers or glass fibers, and a nylon or polypropylene strip which is reinforced with carbon fibers or glass fibers.

When the wrap forms the plurality of adjacent turns around the filter element, it preferably forms a gap between adjacent turns of the wrap which is no greater than the width of the inner layer. The width of the outer layer is also preferably twice the width of the inner layer. In yet another embodiment, the distance from the edge of an inner layer to the edge of the next adjacent inner layer is about twice the width of the inner layer.

BRIEF DESCRIPTION OF THE DRAWINGS

The preferred embodiments of the present invention are explained in greater detail with reference to the following drawings. While various illustrative embodiments of the present invention are shown in the following drawings, the drawings should not be used to limit the scope of the present invention.

FIG. 3 is a plan view of a multi-layer wrap in accordance with the present invention.

FIG. 4 is a plan view of two adjacent strips illustrating a preferred layout of the wrap.

DETAILED DESCRIPTION OF PREFERRED EMBODIMENTS

It will be appreciated that this detailed description provides exemplary embodiments of the invention. Since other embodiments of the invention may differ in detail from the embodiments in this detailed description, the detailed description is intended to reference the particular embodiments being discussed at that point and is not intended to imply any limitation as to the scope of the invention more generally.

Figure 1:
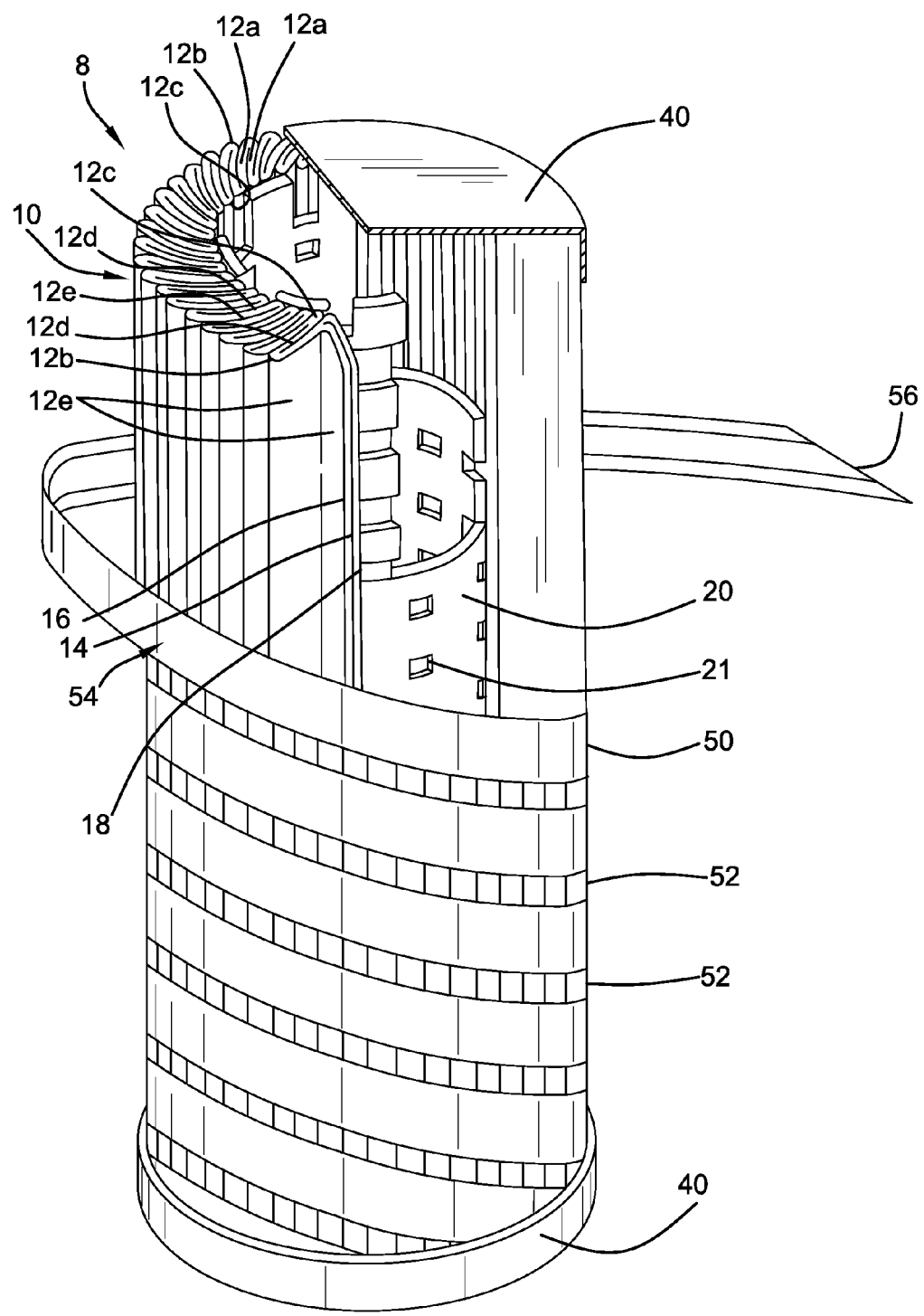
FIG. 1 is a perspective view of a filter made in accordance with one embodiment of the present invention, wherein one of the end caps is partially cut away to show the interior of the filter.
Figure 2:
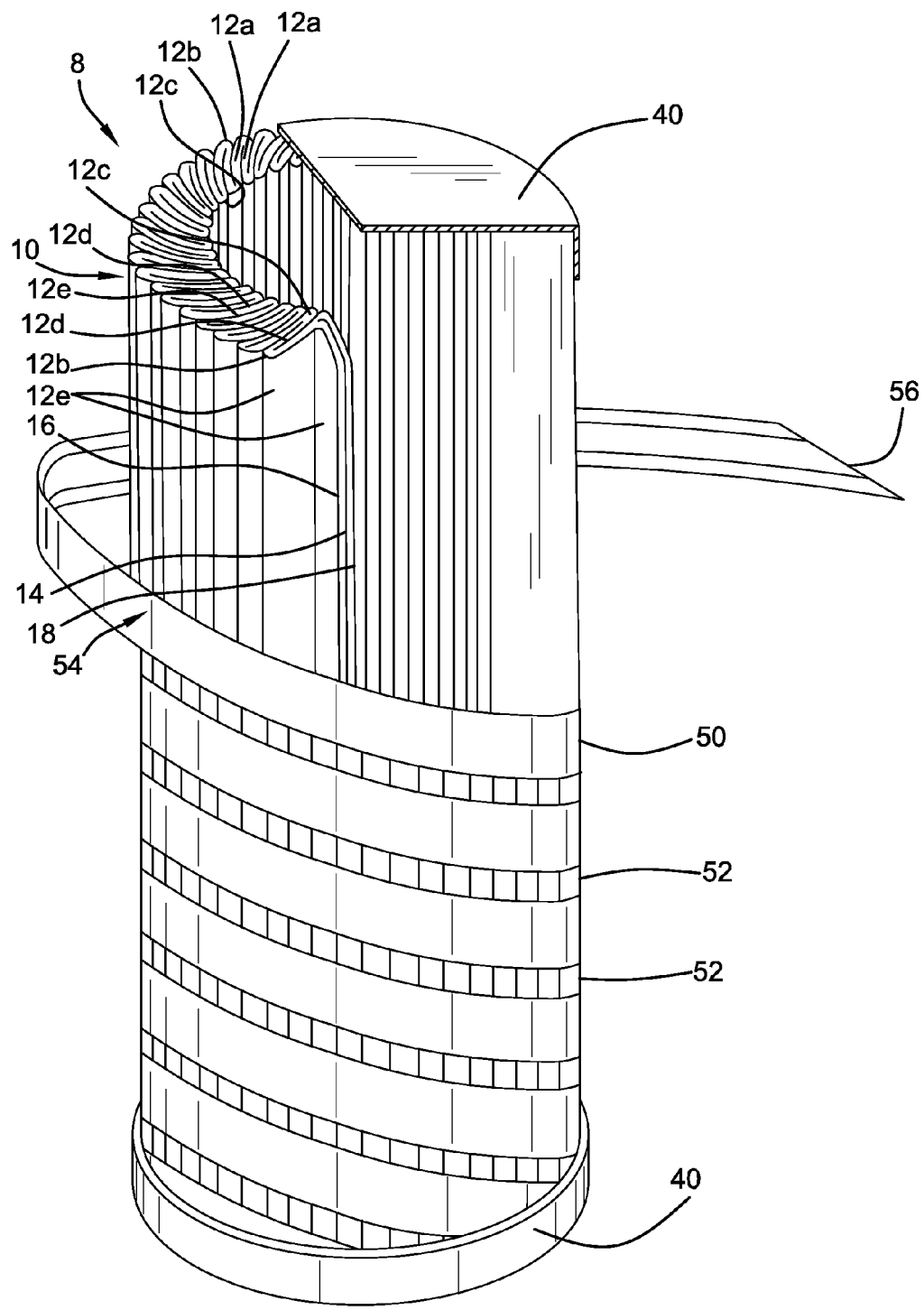
FIG. 2 is a perspective view of a filter made in accordance with a second embodiment of the present invention, wherein one of the end caps is partially cut away to show the interior of the filter.

FIGS. 1-2 illustrate two embodiments of a filter 8 according to the present invention. The filter 8 has a generally cylindrical form and two end caps 40, which seal the ends of a filter element 10. A portion of the top end cap 40 and the filter element 10 is partially cut away to show the interior of the filter 8. A helical wrap member 50 may be disposed along the outer periphery of the filter element 10. In a preferred embodiment, the filter element 10 may comprise a plurality of longitudinal curved pleats 12 or radial pleats (not shown). Those skilled in the art will also appreciate that the wrap member 50 could also be used for non-pleated filter elements, such as a hollow cylindrical mass of fibers.

As shown in FIG. 1, a cylindrical core 20 may be coaxially disposed along the inner periphery of the filter element 10. A core 20 is typically used when the filter is subject to radially inward (outside to inside) fluid flow. Alternatively, when the filter element 10 is subject to radially outward (inside to outside) fluid flow, a cylindrical core may not be necessary as shown in FIG. 2.

As shown in FIGS. 1-2, each pleat 12 has two legs 12*a* which are joined to one another, (1) at the crown or crest 12*b* of the outer periphery of the filter element 10, and (2) to a leg 12*a* of an adjacent pleat 12 at the root 12*c* of the inner periphery of the filter element 10. Each leg 12*a* has an internal surface 12*d* which opposes the internal surface 12*d* of the other leg 12*a* in the same pleat 12. Each leg 12*a* also has an external surface 12*e* which opposes the external surface 12*e* of a leg 12*a* of an adjacent pleat 12. When the filter element 10 is being used such that fluid flows radially inwardly through the element 10, the internal surfaces 12*d* of the legs 12*a* form the downstream surface of the filter element 10, while the external surfaces 12*e* form the upstream surface of the filter element 10. Alternatively, when the filter element 10 is subjected to radially outward fluid flow, the internal surfaces 12*d* and the external surfaces 12*e* form the upstream and downstream surfaces, respectively, of the filter element 10.

Those skilled in the art will appreciate that the filter element 10 may comprise curved or laid-over pleats which are illustrated in the figures or conventional radial pleats (not shown). In one embodiment, the pleat legs 12*a* may have equal length legs. In another embodiment, the pleat legs 12*a* may have with slightly different lengths or unequal length legs. For many filter elements 10, especially those formed from a multilayer composite, it is easier and more reliable to form the pleated filter element 10 if the adjoining legs 12*a* of each curved pleat have slightly different lengths. Such pleats 12 will be referred to as pleats with unequal legs.

As shown in the figures, the opposing inner surfaces 12*d* of the legs 12*a* of each pleat 12 contact each other over substantially the entire height of the legs 12*a* and of the pleat 12 and over a continuous region extending for a significant portion of the axial length of the filter element 10. In addition, the opposing external surfaces 12*e* of the legs 12*a* of adjacent pleats 12 contact each other over substantially the entire height of the adjacent pleats 12 and legs 12*a* and over a continuous region extending for a significant portion of the axial length of the filter element. The height of the pleats 12 and the legs 12*a* is measured in a direction along the surfaces of the legs 12*a* and extends from the inner periphery to the outer periphery of the filter element 10.

The filter element 10 includes a filter medium 14 and drainage means disposed on at least one side, preferably the upstream side, and more preferably on both the upstream and downstream sides of the filter medium 14. When radial pleats are used in the filter element 10, sufficient space typically exists between the upstream and downstream sides of the pleat legs so that fluid may evenly flow to or from substantially all portions of the surface of the filter medium 14. In a preferred embodiment of the present invention, the opposing surfaces of the curved pleats 12 are pressed into contact with each other. Consequently, the strands of the drainage mesh of each leg 12*a* of the pleats 12 are pressed against the strands of the drainage mesh of an adjacent leg 12*a* of the pleats 12. The drainage means prevents opposing surfaces of the filter medium 14 from coming into contact with one another and enables fluid to evenly flow to or from substantially all portions of the surface of the filter medium 14 when curved pleats 12 are used in the filter element. Thus, virtually the entire surface area of the filter medium 14 may be effectively used for filtration.

In the embodiment of FIG. 1, the filter element 10 comprises a three-layer composite of a filter medium 14, upstream drainage means in the form of an upstream drainage layer 16 disposed on the upstream surface of the filter medium 14, and downstream drainage means in the form of a downstream drainage layer 18 disposed on the downstream surface of the filter medium 14. Here, the upstream and downstream surfaces refer to a filter which is subjected to radially inward fluid flow. When the filter is subjected to radially outward fluid flow, the upstream and downstream surfaces are reversed. The layers forming the filter element 10 can be formed into a composite by conventional filter manufacturing techniques, either prior to or simultaneously with corrugation.

There are no particular restrictions on the type of filter medium that can be employed in the present invention, and it can be selected in accordance with the fluid which is to be filtered and the desired filtering characteristics. The filter medium 14 can be used to filter fluids such as liquids, gases, or mixtures thereof. The filter medium 14 may comprise a membrane, a porous film or a fibrous sheet or mass; it may have a uniform or graded pore structure and any appropriate effective pore size; and it may be formed from any suitable material, such as a natural or synthetic polymer, glass, or metal. The filter medium 14 may comprise a single layer, or a plurality of layers of the same medium may be disposed atop one another to a desired thickness. Furthermore, it is possible for the filter medium to include two or more layers having different filtering characteristics, e.g., with one layer acting as a prefilter for the second layer.

In another embodiment, the filter element 10 may comprise several integral regions, including a single, unitary porous sheet having a finely-pored center region, which serves as a filter medium, and coarsely-pored upstream and/or downstream regions which serve as the drainage layers. However, the drainage layers are preferably distinct layers separate from the filter medium. The upstream and downstream drainage layers 16 and 18 can be of the same or different construction. The upstream and downstream drainage layers 16 and 18 can be made of any materials having suitable edgewise flow characteristics, i.e., suitable resistance to fluid flow through the layer in a direction parallel to its surface. The edgewise flow resistance of the drainage layer is preferably low enough that the pressure drop in the drainage layer is less than the pressure drop across the filter medium, thereby providing an even distribution of fluid along the surface of the filter medium. The drainage layers can be in the form of a mesh or screen or a porous woven or non-woven sheet.

Meshes are particularly suitable as drainage layers when the filter medium is a fibrous laid-down medium. On the other hand, when the filter medium is a membrane, a woven or non-woven fabric may be more suitable for use as the drainage layer because a fabric is usually smoother than a mesh and produces less abrasion of adjoining layers of the filter composite.

The filter composite forming the filter element 10 may include other layers in addition to the filter medium 14 and the drainage layers 16 and 18. For example, in order to prevent abrasion of the filter medium due to rubbing contact with the drainage layers when the pleats expand and contract during pressure fluctuations of the fluid system in which the filter is installed, a cushioning layer can be disposed between the filter medium and one or both of the drainage layers. The cushioning layer is preferably made of a material smoother than the drainage layers and having a higher resistance to abrasion than the filter medium 14. For example, when the drainage layers are made of an extruded nylon mesh, an example of a suitable cushioning layer is a polyester nonwoven fabric.

The filter element 10 illustrated in FIG. 1 can be manufactured by a variety of techniques. In one technique, the filter composite is first corrugated to form a corrugated sheet, cut to a suitable length or suitable number of pleats, and then formed into a cylindrical shape. The lengthwise edges of the corrugated sheet are then sealed to each other by conventional means to form a cylindrical filter element 10. When the filter is subject to radially inward fluid flow, the pleats of the filter element 10 are then laid over as the filter element 10 is inserted into a cage 30. After the filter element 10 has been fit into the cage 30, a core 20 is inserted into the hollow center of the filter element 10, and then end caps 40 are attached to the ends of the filter element 10 to form a completed filter.

Usually, a filter according to the present invention will be equipped with end caps 40 at one or both ends of the filter element 10. The end caps 40 can be either blind or open end caps, and may be made of a material which is suitable for the filter conditions and the other materials of the filter components to which the end caps are to be joined. Preferably, the end caps 40 are attached to the filter element 10, but they may also be attached to the core 20 or the cage 30. Conventional techniques can be used to attach the end caps to the filter element 10, such as by use of an epoxy, by polycapping, or by spin welding.

When the filter element 10 is subjected to radially inward fluid flow, the presence of a core 20 is usually desirable because the core 20 supports the inner periphery of the filter element 10 against forces in the radial direction and also helps to give the filter axial strength and rigidity against bending. The core 20 may be of conventional design and may be made of any material having sufficient strength and which is compatible with the fluid being filtered. Openings 21 are formed through the wall of the core 20 to permit the passage of fluid between the outside and the center of the core 20.

However, depending upon the forces acting on the filter element 10 during filtration, it may be possible to omit the core 20. For example, when the fluid flow through the filter element 10 is primarily from the inside to the outside, radially inward forces on the filter element 10 may be absent or so low that a core 20 becomes unnecessary, enabling a reduction in the weight and cost of the filter. The curved pleat configuration shown in FIGS. 1-2 permits uniform pleat support and acts to distribute concentrated loads evenly across the filter element. This minimizes pleat movement and increases the ability of the pleats to retain particles in pulsating flow systems.

A filter according to the present invention preferably includes means for retaining the filter element 10 in a cylindrical configuration. A suitable means of retaining the pleats is a sheet of material wrapped around the filter element with sufficient tension to prevent the pleats from unbending from their pleated state. In FIGS. 1-2, a helical wrap member 50 comprising a parallel-sided strip of a flexible material which is helically wrapped about the filter element 10 in a plurality of turns is provided. The wrap member 50 can be made of any material which is compatible with the fluid being filtered. If the wrap member 50 completely envelops the outer periphery of the filter element 10, the wrap member 50 is preferably porous. While the filter element preferably comprises pleats, the wrap might also be useful for non-pleated filter packs, such as a hollow cylindrical mass of fibers.

The wrap member 50 is made of a material sufficiently strong enough to provide sufficient support against radially outward forces and resist the stresses resulting from inside-to-outside flow. The tension of the wrap member 50 can be selected in accordance with the expected filtering conditions.

The wrap member 50 can be wrapped around the filter element 10 with or without overlap between adjacent turns of the wrap member 50. For example, adjacent turns of the wrap member 50 can abut each other with substantially no overlap, or by employing an overlap, it is possible to wrap multiple layers of the wrap member 50 around the filter element 10. However, it has been found that if the wrap member 50 includes an unobstructed opening, the dirt capacity of the filter element 10 can be greatly increased compared to that of an unwrapped pleated filter element or compared to a pleated filter element completely covered in a wrap member. The openings may be holes formed in the material of the wrap member 50 itself, or they may be gaps 52 left between adjacent turns of the wrap member 50.

In the embodiment of FIGS. 1-2, the wrap member 50 is wrapped around the filter element 10 so as to leave openings in the form of a helical gap 52 between adjacent turns. The wrap member 50 comprises a composite strip of two or more layers, including at least an outer layer 54 and an inner layer 56. The outer layer 54 serves as a "carrier" enabling the wrap member 50 to be securely attached to the exterior of the filter element 10 including, for example, to the crowns 12b of the pleats 12. The outer layer 54 may be formed from a variety of materials, including for example, spun bonded thermoplastic materials, which are compatible with the fluid being filtered, and which will readily bond to an adhesive such as a hot melt adhesive. The outer layer 54 is preferably porous, allowing the hot melt adhesive to penetrate within the layer 54 to form a stronger bond. The outer layer might also be perforated. For many applications, a porous, polymeric, non-woven material available from Reemay Corporation under the trade designation Reemay is suitable. Laminates of the Reemay material can also be employed. Examples of other suitable materials are oil board paper and Mylar film.

The inner layer 56, which provides strength for the wrap composite, provides support against radially outward forces and resists the stresses resulting from inside-to-outside flow and pressure drops across the filter element. The inner layer 56 preferably is a glass or carbon fiber reinforced thermoplastic strip including, for example, a glass or carbon fiber reinforced polyphenylene sulfide (PPS) strip. The glass fiber content preferably may be up to about 70% by weight and the carbon fiber content preferably may be up to about 60% by weight. Polybutylene terephthalate (PUT) reinforced with glass or carbon fibers or uniaxial fabrics or steel ribbons may also be useful for some fluids. Similarly, nylon or polypropylene reinforced with glass or carbon fibers would be useful for mild, non-aggressive fluids such as water.

For filter elements 10 having an outer diameter of about four inches or less, the inner layer 56 preferably should have an elastic modulus of at least about 3 million psi (3 MPSI) to withstand a 150 psid (inside to outside) pressure drop. In a larger filter element 10, including, for example, elements having an outer diameter between four inches and six inches, an inner layer 56 preferably should be able to withstand a 100 psid pressure drop. To withstand up to 150 psid pressure drop, the inner layer 56 preferably should have an elastic modulus of at least about 12 MPSI. To achieve the desired strength characteristics, the inner layer 56 may be formed by stacking multiple layers of the reinforced strips on top of each other.

The outer and inner layers 54, 56 are preferably joined to one another to facilitate manufacture, although with careful manufacturing, they need not be joined together. The outer and inner layers 54, 56 may be joined to one another by (1) a double-sided adhesive tape applied between the two layers, (2) a hot melt adhesive (polyamide hot melt or EVA hot melt) applied between the two layers, or (3) ultrasonically spot welding the two layers.

As shown in FIG. 3, the wrap member 50 may be attached to the exterior of the filter element 10 by applying a bead of hot melt adhesive 58 on both edges of the inner layer 56. On each edge, the hot melt adhesive 58 may flow into the porous outer layer 54 and the edge of the inner layer 56, preventing any fiber migration from the inner layer.

The wrap member 50 is preferably secured in a manner which prevents it from becoming unwound from the filter element 10. In a preferred embodiment, the wrap member 50 is wrapped around the filter element 10 without directly attaching the two together, securing only the two ends 60 of the wrap member 50 to the end caps 40. Before the wrap member 50 is attached to the end cap 40, the ends 60 of the wrap member 50 are cut at angle, as generally shown in FIG. 3, so that substantially the entire length of end 60 may be bonded into the end cap.

After the filter composite (i.e., filter medium and drainage layers) is pleated and formed into a cylindrical shape, the lengthwise edges of the pleated filter composite are sealed to each other to form a cylindrical pleated filter pack. Before the hot melt adhesive beads 58 solidify and before end capping, the wrap member 50 may be helically wrapped around the length of the filter packs. The tension applied to the wrap member 50 should be sufficient to prevent movement of the pleats 12 or ripples in the wrap member 50 between the pleats 12, without crushing or closing off the pleats 12 of the filter pack. The filter pack may be manufactured in 42-44 inch lengths, and the wrap member 50 is applied to the entire 42-44 inch length. Thereafter, the filter pack may be cut to desired lengths of, for example, 40 inches, 20 inches, 13 inches, 8 inches, or 4 inches.

In accordance with the invention, it will be appreciated that the outer layer 54 is preferably wider than the inner layer 56. Thus, when the end 60 of the wrap member 50 is bonded into the end cap 40, the outer layer 54 will help prevent the inner layer 56, which is relatively stiffer than the outer layer 54, from separating from the end cap 40 and filter pack. The materials of the outer layer 54 may also bond better to the adhesives and potting materials used in manufacturing the filter elements, than the materials used to make the inner layer 56. The wider outer layer 54, which is relatively more flexible and typically has better handling characteristics than the materials used in the inner layer 56, provides better handling and performance during the manufacturing process, and minimizes separation between the inner layer 56 and the end cap 40 and filter pack, while maintaining the relative strength characteristics of the inner layer 56.

The wider outer layer 54 also keeps the spread of the adhesive within the periphery of the wrap and minimizes the undesirable mess which may occur if the adhesive spreads outside the wrap periphery. It is preferable that a gap 52 is formed between adjacent turns of the helical wrap member 50 so that gap 52 is no greater than the width of the inner layer 56. Referring to FIG. 4, the width X of gap 52 between the adjacent helical wrap member 50 is the same distance as the width X of the inner wrap 56. In one embodiment, it has been found that an inner layer width of about 0.4 inches is sufficient for many applications. In one preferred embodiment, the outer layer 54 is about twice as wide (2×) as the inner layer 54 so the total distance from the edge of an inner layer 56 to the edge of the next adjacent inner layer is about 2×.

After the combined filter pack and wrap member 50 are cut to the desired length, each filter pack is end capped to form the filter element 10. The end caps 40 may be applied using a potting compound, including, for example, an epoxy or a polyurethane, or a hot melt adhesive. The end cap 40 may be metal or polymeric. Alternatively, a polymeric end cap may be applied to the end of the filter pack/wrap end 60 by melting a portion of the polymeric end cap and inserting the end of the filter pack/wrap end 60 into the molten portion of the end cap 40. In either case, the end of the filter pack/wrap end 60 preferably should be inserted preferably at least 50 thousandths of an inch, and more preferably about 100 thousandths of an inch, into the potting compound or the molten plastic to ensure the wrap member 50 is properly bonded to the filter pack at the end cap 40.

Another method of securing the wrap member 50 is to attach it to the filter element 10 by a bonding agent, such a hot melt adhesive, which is applied to the wrap member 50 as it is wound around the filter element 10. The bonding agent can be applied to the wrap member 50 in the form of a continuous or intermittent bead which spirals around the filter element 10 parallel to the edges of the wrap member 50. Alternatively, if the wrap member 50 is made of polymeric material, it may be fusion bonded to the filter element 10 by a hot wheel which travels down the length of the filter element 10 as the filter element 10 is rotated. The wrap member 50 can be attached directly to the filter element 10, or if there is overlap between adjacent turns of the wrap member 50, the adjacent turns can be attached directly to one another.

This disclosure is intended to be illustrative and not exhaustive. The disclosure will suggest many variations and alternatives to one of ordinary skill in the art. All these variations and alternatives are intended to be included within the scope of the present invention and appended claims. Those familiar with the art may recognize other equivalents to the embodiments described herein which are intended to be included within the scope of the present invention and appended claims.

The invention claimed is:

1. A filter for filtering particulates from fluid and gas streams comprising:
   a cylindrical filter element for filtering material in response to fluid flow through the filter element, wherein the filter element has a longitudinal axis, and a top and bottom end;
   an end cap forming a fluid tight seal secured to an end of the filter element;
   and a porous wrap helically wrapped around the filter element to form a plurality of adjacent turns under tension to hold the filter element in a cylindrical configuration, wherein the wrap comprises an outer strip made from a first material and for attaching to the end cap and an inner strip made from a second material and for resisting radially outward forces generated by a pressure drop across the filter element, the first material being different from the second material, and wherein the inner strip has parallel edges defining an inner strip width laterally therebetween, and the outer strip has parallel edges defining an outer strip width laterally therebetween, the inner strip width being narrower than the outer strip width, the inner strip being disposed laterally within the outer strip, and wherein the wrap has two ends disposed so that the outer and inner strips may attach to the end cap.

2. The filter of claim 1 wherein the outer strip is inserted at least 50 thousandths of an inch into the end cap.

3. The filter of claim 1 wherein the outer strip is inserted at least 100 thousandths of an inch into the end cap.

4. The filter of claim 1 wherein the inner strip has a modulus of elasticity of at least about 3 million psi to withstand the pressure drop caused by inside out flow across the filter element.

5. The filter of claim 1 wherein the inner strip has a modulus of elasticity of at least about 12 million psi to withstand the pressure drop caused by inside out flow across the filter element.

6. The filter of claim 1 wherein the filter element comprises at least one filter medium having first and second sides, a first drainage layer disposed on the first side of the filter medium and a second drainage layer disposed on the second side of the filter medium.

7. The filter of claim 6 wherein at least one of the first drainage layer and the second drainage layer comprise a polymeric mesh.

8. The filter of claim 6 wherein at least one of the first drainage layer and the second drainage layer comprise yin extruded or woven polymeric mesh.

9. The filter of claim 1 wherein the inner strip comprises a polyphenylene strip.

10. The filter of claim 9 wherein the polyphenylene strip is reinforced with carbon fibers.

11. The filter of claim 10 wherein the polyphenylene strip is reinforced with up to about 60% by weight of carbon fiber content.

12. The filter of claim 9 wherein the polyphenylene strip is reinforced with glass fibers.

13. The filter of claim 12 wherein the polyphenylene strip is reinforced with up to about 70% by weight of glass fibers.

14. The filter of claim 1 wherein the inner strip comprises a polybutylene terephthalate strip.

15. The filter of claim 14 wherein the polybutylene terephthalate strip is reinforced with one of either carbon fibers or glass fibers.

16. The filter of claim 1 wherein the inner strip comprises a nylon strip.

17. The filter of claim 16 wherein the nylon strip is reinforced with one of either carbon fibers or glass fibers.

18. The filter of claim 1 wherein the inner strip comprises a polypropylene strip.

19. The filter of claim 18 wherein the polypropylene strip is reinforced with one of either carbon fibers or glass fibers.

20. The filter of claim 1 wherein the outer strip is attached to the inner strip.

21. The filter of claim 1 wherein the inner strip is attached to the outer strip by a double-sided adhesive tape applied between the inner and outer strips.

22. The filter of claim 1 wherein the inner strip is attached to the outer strip by a hot melt adhesive applied between the inner and outer strips.

23. The filter of claim 1 wherein the inner strip is attached to the outer strip by ultrasonically spot welding the inner and outer strips.

24. The filter of claim 1 wherein the wrap forms a gap between adjacent turns of the wrap so that the gap is no greater than the width of the inner strip.

25. The filter of claim 1 wherein the outer strip width of the outer strip is two times the inner strip width of the inner strip.

26. The filter of claim 1 wherein the outer strip width of the outer strip is two times the inner strip width of the inner strip, and the wrap forms a gap between adjacent turns of the wrap so that the gap is no greater than the inner strip width of the inner strip.

27. The filter of claim 1 wherein the distance from edge of an inner strip to the edge of the next adjacent inner strip is about two times the inner strip width of the inner strip.

* * * * *